United States Patent [19]

Kudo

[11] 4,106,066
[45] Aug. 8, 1978

[54] MAGNETIC DISC CARTRIDGE

[75] Inventor: Ryosuke Kudo, Yokohama, Japan

[73] Assignee: Fujitsu Limited, Japan

[21] Appl. No.: 750,821

[22] Filed: Dec. 15, 1976

[30] Foreign Application Priority Data

Dec. 22, 1975 [JP] Japan .............................. 50-151916

[51] Int. Cl.² ............................................ G11B 23/02
[52] U.S. Cl. .................................................. 360/133
[58] Field of Search ......................... 360/133; 206/444

[56] References Cited

U.S. PATENT DOCUMENTS 3,917,068 11/1975 Cheney ............................... 360/133

OTHER PUBLICATIONS

"Record Disc Assemblies", Griffiths et al., IBM Tech. Disc. Bull., vol. 16, No. 12, May 1974, p. 3838.

Primary Examiner—Robert S. Tupper
Attorney, Agent, or Firm—Staas & Halsey

[57] ABSTRACT

A magnetic disc cartridge comprising: a support disc which carries at least one magnetic disc on its circumference; a magnetic disc housing case having an opening through which at least one magnetic head enters; a closure mechanism for covering said opening; and a holding mechanism which holds said support disc down on a base member of said housing case. The support disc has at least one hole in its hub through which circulating clean air flows in. A cover for said hole is arranged cooperating with said closure mechanism so that said cover opens when said closure mechanism opens and closes when said closure mechanism closes.

11 Claims, 5 Drawing Figures

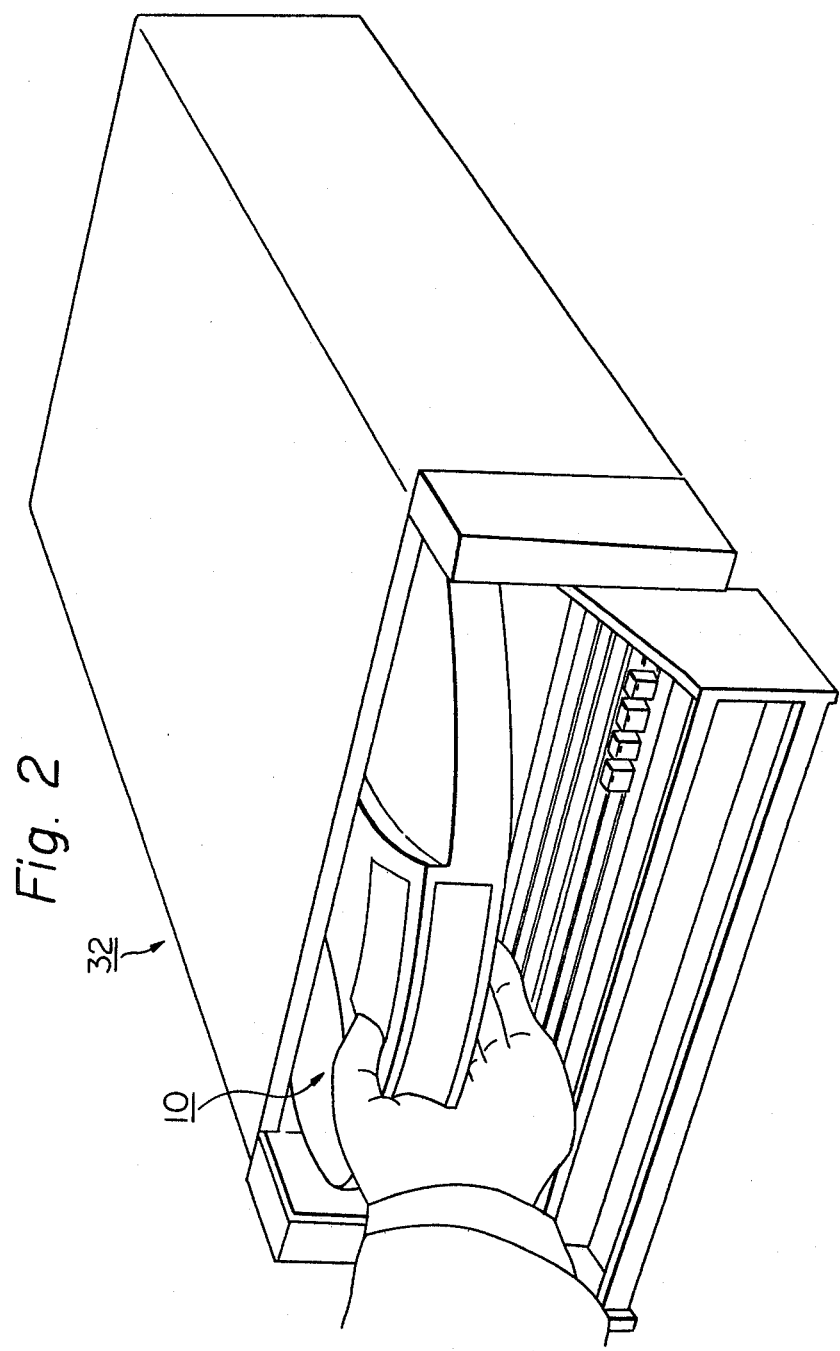

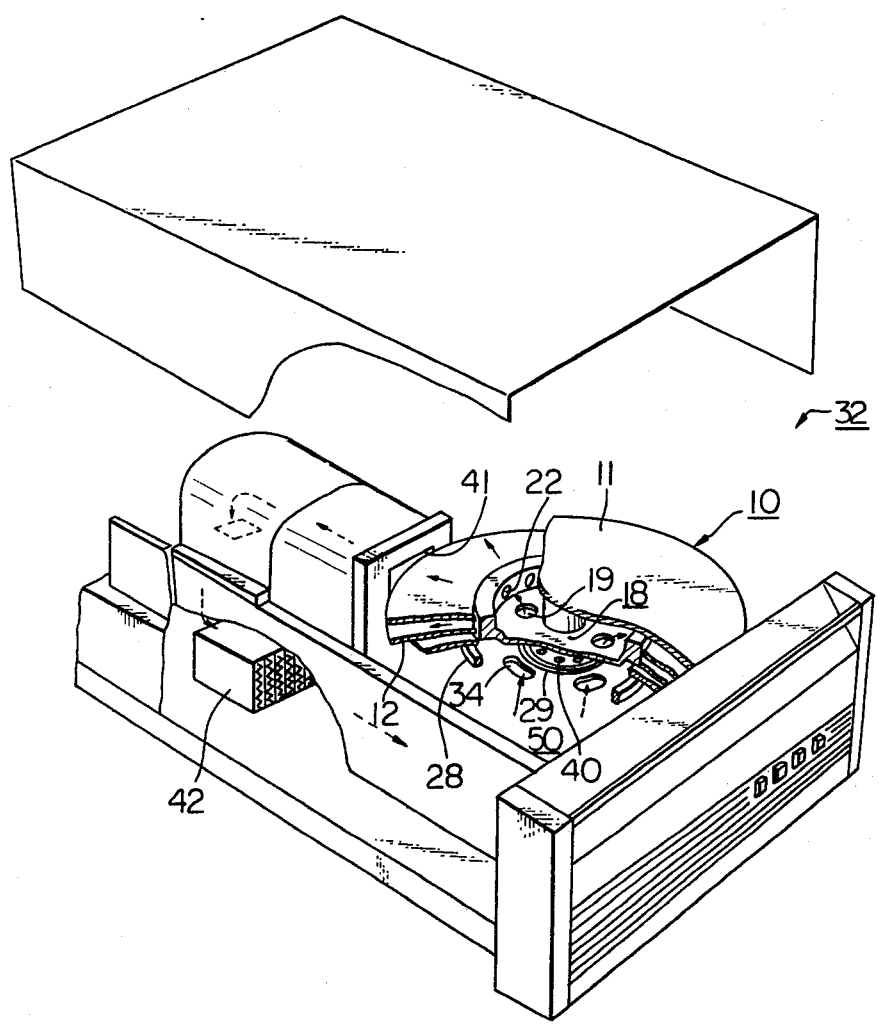

MAGNETIC DISC CARTRIDGE

BACKGROUND OF THE INVENTION

The present invention relates to a magnetic disc cartridge for a magnetic disc unit used in a computer device. The magnetic disc cartridge is used for easily setting the magnetic disc in a magnetic disc driving unit by inserting the cartridge into said driving unit through its front face. A known type of the magnetic disc cartridge comprises: a support disc which carries a magnetic disc on its circumference and has a center mortise which fits with a rotatable spindle of a magnetic disc driving unit; a magnetic disc housing case having an opening in its side wall through which a magnetic head enters; a closure mechanism for covering said opening arranged so that it closes when the cartridge is out of said driving unit and opens when the cartridge is set into said driving unit; and a holding mechanism which holds said support disc down on a base member of said housing case when said closure mechanism closes. Such a known magnetic disc cartridge is shown in FIG. 3. A magnetic disc cartridge 10' of the prior art comprises a support disc 18' and a magnetic disc housing case 11'. The support disc 18' carries a magnetic disc 12' on its thickened circumference and has a center mortise 21' which fits with a rotatable spindle 29' of a magnetic disc driving unit (not shown). The housing case 11' has an opening 14' in its side wall through which a magnetic head (not shown) enters to read or write memories on the magnetic disc 12'. A closure mechanism 13' for covering said opening 14' comprises a cap member 15' and a closure member 23'. The closure mechanism 13' is opened in FIG. 3. when the cartrige is set into the driving unit, the cap member 15' is lifted up by a lifting mechanism (not shown) to open the closure mechanism 13' as shown in FIG. 3. When the cartridge is out of the driving unit, the cap member 15' is forced downward by a spring 17' or by its own resiliency to close the closure mechanism 13'. As the closure mechanism 13' closes, a center holder 31' depresses the support disc 18'. Accordingly, the thickened rim of the support disc 18' is held down on the base member of the housing case 11'. The support disc 18' is thereby tightly held in the housing case 11' when the cartridge 10' is not in use. The housing case 11' has a hole 19' in its base member through which circulating clean air flows into the case 11' when the cartridge is in operation. A cover 20' is arranged over the hole 19'. The cover 20' is always drawn toward the hole 19' to close said hold by a spring 40'. When the cartridge is set into the driving unit, the cover 20' is lifted up against the force of the spring 40' by the dynamic pressure of the circulating clean air. The contraction force of the spring 40' must be weak enough to be overcome by the dynamic pressure of the circulating clean air. The clean air flows into the case 11' through the hole 19' as shown by the two branching arrows in FIG. 3, and flows out of the case 11' through the opening 14'.

The above-mentioned known type of the magnetic disc cartridge has the following drawbacks:

(A) The circulating clean air mainly flows on the underside of the magnetic disc in the cartridge. Accordingly, satisfactory cleaning cannot be achieved on the upper surface of the magnetic disc.

(B) The circulating clean air leaks out of the cartridge during operation through a gap between a lower rim of a cylindrical hole 52' and the center holder 31' and through an annular space between a projection 16' and the cylindrical hole 52'.

(C) When the cartridge is not in use, it is not satisfactorily sealed. Dusty air enters into the cartridge through the hole 19' in spite of the cover 20'. This is because the cover 20' can be easily and unintentionally opened by accidentally touching the cover 20' during the transportation or storage of the cartridge. The outer dusty air can also easily enter into the cartridge through the annular space between the projection 16' and the cylindrical hole 52'.

(D) When the cartridge is drawn out of the driving unit, the support disc 18' is pressed down by the center holder 31' at the center of the support disc 18'. Downward pressure is exerted on the outer circumference of the disc 18' which is located on the inside rim of the base member of the housing case 11'. Support disc 18' becomes deformed as a result of these pressures.

SUMMARY OF THE INVENTION

An object of the present invention is to provide a magnetic disc cartridge in which the above-mentioned drawbacks are obviated. According to the present invention, support disc of the improved magnetic disc cartridge has at least one hole in its hub through which circulating clean air flows in, and, a cover for said hole is arranged for cooperating with said closure mechanism so that said cover opens when said closure mechanism opens and closes when said closure mechanism closes.

BRIEF DESCRIPTION OF THE DRAWINGS

The present invention will now be further described with reference to the accompanying drawings, in which:

FIG. 2 shows an operator inserting the cartridge, according to the present invention, into a driving unit;

FIG. 5 shows the inside of a driving unit into which the cartridge, according to the invention, is set.

DETAILED DESCRIPTION OF THE EMBODIMENTS OF THE INVENTION

Figure 1:
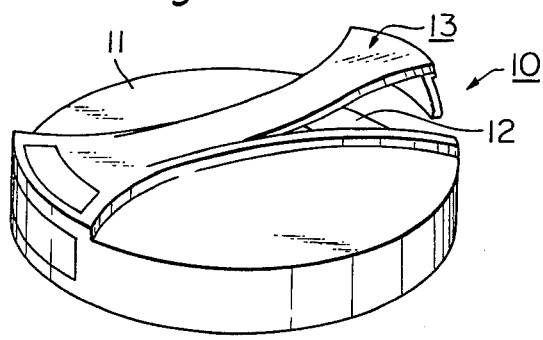
FIG. 1 shows the external appearannce of a magnetic disc cartridge, according to the present invention, in which the closure mechanism is opened.
Figure 3:
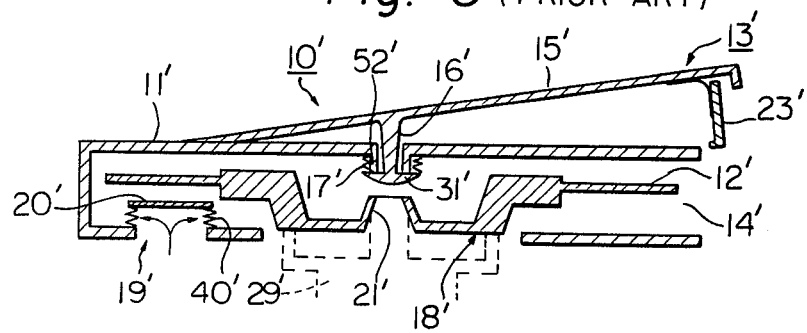
FIG. 3 is a sectional view of a magnetic disc cartridge according to the prior art.

A magnetic disc cartridge 10 according to the invention, which has an external appearance as shown in FIG. 1, is inserted into a driving unit 32 through its front face as shown in FIG. 2.

Figure 4:
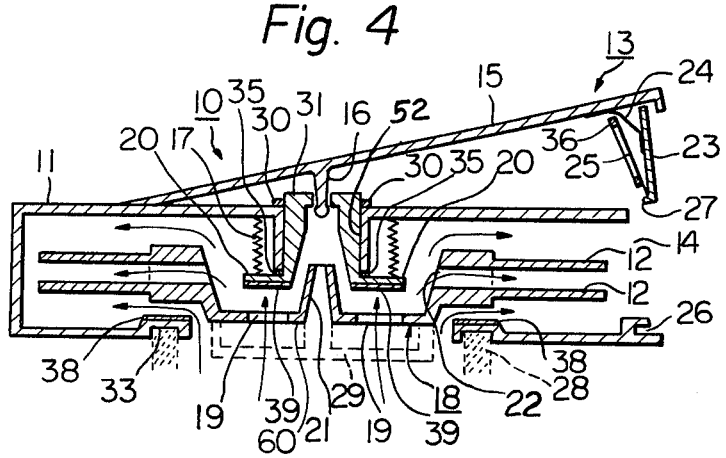
FIG. 4 is a sectional view of a magnetic disc cartridge according to the invention.

An embodiment of the invention will be precisely described with reference to FIG. 4. A magnetic disc cartridge 10 comprises a support disc 18, which carries two magnetic discs 12 on its thickened rim, and a magnetic disc housing case 11. The support disc 18 has a center mortise 21 which fits with a rotatable spindle 29 of a magnetic disc driving unit (not shown). The housing case 11 has an opening 14 in its side wall through which four magnetic heads (not shown) corresponding to the upper and lower faces of the two magnetic discs, respectively, enter. A closure mechanism 13 for covering said opening 14 comprises a cap member 15 and a closure member 23. The closure member 23 is resiliently mounted on the cap member 15 by a leaf spring 24. The closure member 23 has a hook 27 at its lower end which engages with a recess 26 in the housing case 11. The cap member 15 has a projection 16 which is connected to a center holder 31. The center holder 31 is slidably arranged in a cylindrical hole 52 provided in the upper member of said housing case 11. The support disc 18 has holes 19 in its hub 60 through which circulating clean air flows in. A cover 20 for the holes 19 is provided at the lower end of center holder 31. A spring 17 is arranged between the case 11 and the cover 20. The spring 17 always urges the cover 20 toward the holes 19. The thickened rim of the support disc 18 has apertures 22 which communicate the inside of the support disc 18 with the space between the two magnetic discs 12. The base member of the case 11 has an annular recess 33 into which a sealing member 28 of the driving unit can be fitted. A sealing member 38 is arranged on the inside rim of the base member of said case 11. Sealing members 30 and 35 are arranged on the upper rim and on the lower rim of the cylindrical hole 52, respectively. A sealing member 39 is arranged on the underside of the cover 20. A sealing member 36 is also arranged inside of the closure member 23. The sealing member 36 is fixed to a leaf spring 25 which is mounted inside of said closure member 23. The cover 20 should preferably be slightly inclined downward toward the outer rim. Accordingly, the closing pressure which is applied to the cover 20 by the spring 17 is exerted on the support disc hub 60 at the portion remote from the center of the support disc 18.

The operation of the magnetic disc cartridge according to the invention will now be described. As the cartridge 10 is inserted into the driving unit 32 (FIG. 2), the hook 27 is released from the recess 26 (FIG. 4), and the cap member 15 is lifted up by a lifting mechanism (not shown) of the driving unit 32. When the cartridge 10 is completely inserted into the driving unit 32, the housing case 11 is set on the annular sealing member 28 of the driving unit 32, and the support disc 18 is made to bear down on the spindle 29 of the driving unit 32. The center holder 31, which cooperates with the opening operation of the closure mechanism 13, is lifted up against the force of the spring 17. The opening 14 (FIG. 4) of the case 11 is sealingly connected to a gate 41 (FIG. 5) through which magnetic heads enter the cartridge 10. When the magnetic discs 12 are rotated, the centrifugal effect created by the rotation generates a pressure gradient in the case 11, that is, the outer circumferences of the discs 12 are of a higher pressure than the center portion of the cartridge. Accordingly, the air in the cartridge flows spontaneously from the center portion to the outer circumferences of the discs 12 as shown by the solid arrows in FIG. 5. The air then flows out of the cartridge 10 through the opening 14 (FIG. 4) and then enters the driving unit 32 through the gate 41 (FIG. 5). The air then flows into the driving unit 32 as shown by the dotted arrows in FIG. 5. The air passes a filter unit 42 located in the driving unit, and the air is cleaned. The air then flows into the cartridge again through holes 34 of a base plate 50 of the driving unit, through holes 40 of the spindle 29, and through holes 19 of the support disc 18. In this way, the clean air circulates in a closed circuit inside the driving unit and the cartridge. In such an operating condition, as shown in FIG. 4, the outer dusty air cannot enter the cartridge 10 through the gap between the cylindrical hole 52 and the center holder 31, because the sealing member 35 is arranged on the lower rim of the cylindrical hole 52 against which the cover 20 sealingly abuts. A satisfactory amount of the clean air flows on the upper surface of the upper magnetic disc 12, because the air enters the cartridge through the holes 19 in the hub 60 of the support disc 18 and flows over the rim of the support disc 18 onto said disc 12. The clean air flowing across the lower surface of lower magnetic disc 12, however, need not traverse holes 19. The upper surface of the lower magnetic disc 12 and lower surface of upper magnetic disc 12 are also fully cleaned by the clean air, because the clean air flows through the apertures 22 into the space between the two discs 12 and 12.

When the cartridge 10 is drawn out of the driving unit, the closure mechanism 13 is closed by the force of the spring 17 and by the restoring resiliency of the cap member 15. In spite of the frictional resistance of the sealing member 36, the closure member 23 smoothly slides down along the edge of the opening 14. This is because the sealing member 36 is resiliently fixed to the closure member 23 by the leaf spring 25. As the closure mechanism 13 closes, the center holder 31 slides down along the cylindrical hole 52 until the cover 20 abuts against the hub portion of the support disc 18 and finally holdes the support disc 18 down on the inside rim of the base member of the housing case 11. When cartridge 10 is in this closed condition, the cover 20 depresses the support disc 18 at its outer rim because the cover 20 is slightly inclining downward toward the outer rim. Accordingly, deformation of the support disc 18 is minimized. When the closure mechanism 13 closes, the outer dusty air cannot enter the cartridge through the gap between the cylindrical hole 52 and the center holder 31. This is because the sealing member 30 is arranged along the upper rim of the cylindrical hole 52 and because the cap member 15 sealingly abuts against the sealing member 30. Furthermore, when the cartridge is closed, the sealing members 36 and 38 prevent outer dusty air from entering into the cartridge through the opening 14 and through the gap between the seating face of the support disc 18 and the inside rim of the base member of the case 11. The outer dusty air is also prevented from entering the cartridge through the holes 19, because the sealing member 39 is arranged on the underside of the cover 20 and the spring 17 depresses the cover 20 to tightly close the holes 19.

The invention has been described with reference to the preferred embodiment. Obviously, other modifications and alternations may be effected upon reading and understanding this specification. It is intended that all such modifications and alternations be included insofar as they come within the scope of the appended claims or the equivalents thereof.

What is claimed is:

1. A magnetic disc cartridge of the type having
   a support disc which carries at least one magnetic disc on its circumference, has a center mortise which fits with a rotatable spindle of a magnetic disc driving unit, and has a hub containing at least one hole through which circulating clean air can flow;
   a magnetic disc housing case having an opening in its side wall through which at least a magnetic head enters;
   a closure mechanism comprising a top member which is resiliently secured to said case at one end of the member and has a closure member at the other end thereof for covering said opening of said case, said closure member including means cooperating with said magnetic disc drive unit for lifting said top member from a closed to an open position when said cartridge is set into said driving unit and for restoring said top member to its closed position when said cartridge is out of said driving unit; and a holding mechanism which holds said support disc down on a base member of said housing case when said closure mechanism closes, wherein the improvement comprises:

a cover for said at least one hole in said hub; and means operationally connected to said top member of said closure mechanism for lifting said cover to open said at least one hole when said cartridge is set into said driving unit and depressing said cover to close said at least one hole when said cartridge is out of said driving unit.

2. A magnetic disc cartridge according to claim 1, wherein said means operationally connected to said top member comprises spring means for forcing said cover toward said support disc hub to close said at least one hole when said cartridge is out of said driving unit; and means interconnected to said closure mechanism for lifting said cover away from said at least one hole, against the depressing force of said spring toward said at least one hole, when said cartridge is set into said driving unit.

3. A magnetic disc cartridge according to claim 1, wherein said magnetic disc housing case has a central, cylindrical hole having upper and lower rims; said magnetic disc housing case has a base member having a contacting face adjacent to said support disc; said closure mechanism is positioned having a portion thereof facing inside said magnetic disc cartridge when said top member is in its closed position; and said cover for said at least one hole in said support disc hub has an underside adjacent to said at least one hole; and further comprising sealing members arranged on said upper and lower rims; on said contacting face; hole formed on the upper member of said housing case through which a center holder slides in cooperation with said closure mechanism; on an inside rim of said base member of said housing case on which said support disc is seated when said cartridge is drawn out of said driving unit; on said inside of said closure member; and on said underside of said cover.

4. A magnetic disc cartridge according to claim 1, wherein said closure member is positioned having a portion thereof facing said magnetic disc cartridge when said top member is in its closed position, and further comprising a leaf spring mounted on said inside of said closure member, said leaf spring having a portion thereof facing inside said magnetic disc cartridge when said top member is in its closed position, and a sealing member arranged on said inside of said leaf spring.

5. A magnetic disc cartridge according to claim 1, wherein said support disc has a thickened rim at its circumference and two magnetic discs are mounted at spaced-apart positions on said thickened rim, said thickened rim having at least one aperture communicating the space between said two magnetic discs with the region enclosed by said thickened rim.

6. A magnetic disc cartridge comprising:

a magnetic disc housing case having a base member and a side wall with a head opening;

first means for closing said head opening, said first means being mounted on said housing case and being movable between a closed position in which said head opening is closed and an open position in which said head opening is open;

a support disc which carries at least one magnetic disk on its circumference, and which has at least one hole between its center and periphery enclosed within said housing case, said support disc being movable from a position contacting said base member to a position spaced-apart from said base member;

a cover for said at least one hole in said support disc, said cover being movable from a position contacting said support disc to a position spaced-apart from said support disc; and second means operationally connected to said first means for moving said cover into contact with said support disc and said support disc into contact with said base member when said first means is in its closed position.

7. The magnetic disc cartridge of claim 6, wherein said housing case has a recess positioned near said head opening and wherein said first means comprises:

an elongated cap member having first and second ends, the first end being movably mounted to said housing case;

a first leaf spring mounted to the second end of said cap member;

a closure member mounted on said first leaf spring, said closure member having at one end thereof a hook mating with the recess in said housing case;

a second leaf spring mounted on said closure member near said hook; and a sealing member mounted on said second leaf spring.

8. The magnetic disc cartridge of claim 6, wherein said cover is configured to contact said support disc only at the periphery of said cover.

9. The magnetic disc cartridge of claim 6, wherein said support disc has a thickened rim and further comprising two magnetic discs mounted at spaced-apart positions on said thickened rim, said thickened rim having at least one hole extending through said thickened rim to the region between said two magnetic discs.

10. The magnetic disc cartridge of claim 6, wherein said housing case has a top surface having a centrally disposed opening therein and wherein said second means comprises:

a center holder slidably mounted in the centrally disposed opening in the top surface of said housing case, said cover being mounted on said center holder; and a spring extended between the top surface of said housing case and said cover.

11. The magnetic disc cartridge of claim 10, further comprising sealing members mounted between said first means and the top surface of said housing case; between said cover and said top surface of said housing case; between said cover and said support disc; and between said support disc and said base member.

* * * * *

UNITED STATES PATENT AND TRADEMARK OFFICE
CERTIFICATE OF CORRECTION

PATENT NO.  : 4,106,066
DATED       : August 8, 1978
INVENTOR(S) : Ryosuke Kudo

It is certified that error appears in the above-identified patent and that said Letters Patent are hereby corrected as shown below:

Column 1, line 34, "when the cartrige" should be --When the cartridge--.
Column 1, line 50, "hold" should be --hole--.
Column 6, line 9, "disk" should be --disc--.

Signed and Sealed this

Sixteenth Day of January 1979

[SEAL]

Attest:

RUTH C. MASON
*Attesting Officer*

DONALD W. BANNER
*Commissioner of Patents and Trademarks*